US007000645B2

(12) United States Patent
Glejbøl et al.

(10) Patent No.: US 7,000,645 B2
(45) Date of Patent: Feb. 21, 2006

(54) ARMOURED, FLEXIBLE PIPE

(75) Inventors: Kristian Glejbøl, Glostrup (DK);
Niels-Jørgen Rishøj Nielsen, Birkerød (DK)

(73) Assignee: NKT Flexibles I/S, (DK)

( * ) Notice: Subject to any disclaimer, the term of this patent is extended or adjusted under 35 U.S.C. 154(b) by 63 days.

(21) Appl. No.: 10/398,714

(22) PCT Filed: Oct. 3, 2001

(86) PCT No.: PCT/DK01/00641

§ 371 (c)(1),
(2), (4) Date: Aug. 14, 2003

(87) PCT Pub. No.: WO02/31394

PCT Pub. Date: Apr. 18, 2002

(65) Prior Publication Data
US 2004/0050442 A1    Mar. 18, 2004

(51) Int. Cl.
*F16L 11/00*    (2006.01)
(52) U.S. Cl. .................. 138/131; 138/129; 138/134
(58) Field of Classification Search ........... 138/129, 138/130, 135, 136, 150
See application file for complete search history.

(56) References Cited

U.S. PATENT DOCUMENTS

| 3,858,616 | A | * | 1/1975 | Thiery et al. ............... 138/133 |
| 4,213,485 | A | | 7/1980 | Ottewell et al. |
| 4,402,346 | A | | 9/1983 | Cheetham et al. |
| 4,867,205 | A | | 9/1989 | Bournazel et al. |
| 5,052,544 | A | | 10/1991 | Anderson |
| 5,176,179 | A | * | 1/1993 | Bournazel et al. .......... 138/130 |
| 5,275,209 | A | * | 1/1994 | Sugier et al. ............... 138/135 |
| 5,499,661 | A | | 3/1996 | Odru et al. |
| 5,601,893 | A | * | 2/1997 | Strassel et al. ............ 428/35.9 |
| 5,645,109 | A | * | 7/1997 | Herrero et al. ............. 138/134 |
| 5,730,188 | A | * | 3/1998 | Kalman et al. ............. 138/135 |
| 5,813,439 | A | * | 9/1998 | Herrero et al. ............. 138/134 |
| 5,918,641 | A | * | 7/1999 | Hardy et al. ................ 138/132 |
| 6,039,083 | A | * | 3/2000 | Loper ......................... 138/135 |
| 6,065,501 | A | * | 5/2000 | Feret et al. ................. 138/134 |
| 6,145,546 | A | * | 11/2000 | Hardy et al. ................ 138/136 |
| 6,283,161 | B1 | * | 9/2001 | Feret et al. ................. 138/134 |
| 6,408,891 | B1 | * | 6/2002 | Jung et al. .................. 138/127 |

FOREIGN PATENT DOCUMENTS

FR    2764669    12/1998

(Continued)

OTHER PUBLICATIONS

International Search Report for PCT/DK 01/00641, mailed Jan. 21, 2002 (2 pages).

*Primary Examiner*—James Hook
(74) *Attorney, Agent, or Firm*—Finnegan, Henderson, Farabow, Garrett & Dunner, L.L.P.

(57) ABSTRACT

A flexible, armored pipe is disclosed. In an exemplary embodiment, the flexible, armored pipe includes an impermeable liner, an outer armoring layer, and an inner armoring layer. The inner armoring layer includes one or more wound armoring elements, and the outer armoring layer is placed on the outside of the liner, and includes at least two layers of wound armoring elements which are completely or partly permeable for fluids. Further, the inner armoring layer is placed on the inside of the liner. In certain embodiments, the inner armoring is built up of wound profiles, K profiles, or profiles which include a rolled strip.

18 Claims, 2 Drawing Sheets

FOREIGN PATENT DOCUMENTS

| | | |
|---|---|---|
| JP | 3265781 | 11/1991 |
| WO | WO 97/28393 | 8/1997 |
| WO | WO 98/57085 | 12/1998 |
| WO | WO 99/06750 | 2/1999 |
| WO | WO 00/36324 | 6/2000 |
| WO | WO 01/81809 | 11/2001 |

\* cited by examiner

ARMOURED, FLEXIBLE PIPE

This application is a national stage filing under 35 U.S.C. §371 of International Application No. PCT/ DK01/00641, filed on Mar. 10, 2001, which published in the English language. This application also claims the benefit of priority under 35 U.S.C. 0119(a) to DK Patent Application No. PA-2000-01510, filed on Oct. 10, 2000.

The present invention relates to a flexible, armoured pipe comprising at least an impermeable liner, an outer armouring layer and an inner armouring layer consisting of one or more wound armouring elements.

Such pipes are used for the transport of oil and gas in deep or varying depths of water. These pipes are particularly suitable for the transport of oil from underwater installations to floating installations on the surface of the sea, where the oil is refined or transported further for processing.

For example, JP3265781 and FR2764669-A1 describe armoured flexible pipes where the whole of the armouring is surrounded by an impermeable sheath which prevents the ingress of fluids from the surroundings to the pipe's armouring layer, which provides the advantage that the pipe's armouring can be executed in materials which, if unprotected, cannot withstand the surrounding environment.

Conversely, U.S. Pat. No. 4,402,346 describes a pipe where the armouring is surrounded by a permeable outer sheath, which provides the advantage that aggressive gases, which diffuse out through the inner liner, do not accumulate in the armouring layer. However, a problem in connection with this method is that fluids will penetrate through the outer sheath and exercise a hydrostatic pressure corresponding to the pressure of the surroundings in the armouring layer and herewith on the non-reinforced liner, the result being that under certain conditions the surrounding pressure will be able to crush or collapse the liner. Moreover, the liner will be able to collapse if a high tensile load is placed on the pipe.

It is the object of the present invention to provide a flexible pipe where the resistance against crushing and collapse of the liner as a result of the surrounding pressure is retained, while at the same time the pipe's outer armouring is protected against the damaging effect of fluids which diffuse from the inside of the liner and out to the surroundings.

The object of the invention is achieved with a pipe of the type disclosed in the preamble to claim 1, which is characterised in that the outer armouring layer is placed on the outside of the liner and consists of at least two layers of wound armouring elements which are partly or completely permeable for fluids, while the inner armouring layer is placed on the inside of the liner.

With this construction, a flexible pipe is provided where the inner armouring layer is in contact with the fluid, which is to be transported in the pipe, while the outer armouring layer and the outer side of the impermeable liner are in contact with the surroundings.

This means that the inner armouring layer absorbs the hydrostatic pressure applied to the liner, unlike earlier where this pressure was partly or completely absorbed by one of two layers of armour placed in between the impermeable liner and an outer, impermeable sheath.

Moreover, since no significant restrictions to mass transport exist outside the impermeable liner, gases, which diffuse through the liner, will now be able to escape to the surroundings.

In other words, a flexible pipe with only three layers is now provided, which meets the demands most often placed on flexible pipes with several layers.

Moreover, the pipe achieved is one where the different layers are used more effectively than has hitherto been the case, which, if the pipe produced is long, affords a saving in weight, which is of great importance.

The forces, which the inner armouring is required to withstand, depend on the use of the pipe. If, for example, the pipe is used as production pipe between a floating installation on the surface of the sea and an installation on the seabed, the inner armouring in the pipe's lower part is loaded primarily as a result of hydrostatic forces stemming from that water pressure which acts on the outside of the liner. In contrast hereto, the inner armouring in the pipe's upper part will be loaded primarily as a result of the forces with which the outer armouring clamps around the liner due to the axial load which is applied to the outer armouring.

Since the outer armouring lies around the pipe's impermeable liner, this armouring will not be required to absorb forces resulting from the outer hydrostatic pressure. The outer armouring in the pipe's lower part shall thus primarily absorb the forces which act on the liner as a result of the pipe's inner over-pressure, while the outer armouring in the top of the pipe shall be able to absorb the forces not only from the pipe's inner over-pressure, but also from the axial forces which stem from the inherent weight of the pipe. Since a considerable part of the outer armouring is wound with an angle different from zero, relative to the axis of the pipe, the absorption of axial forces will give rise to a quasi-hydrostatic pressure on the liner, which must be absorbed by the inner armouring. Moreover, a part of or the whole of the outer armouring will be wound with an angle which ensures that the outer armouring can counteract deformation of the liner as a result of the pressure on the inside of the liner.

In that the outer pressure influences the outer armouring layers hydrostatically, and in that the outer pressure acts directly on the pipe's liner, it is not decisive for the function of the pipe that the outer armouring layer possesses compressive rigidity in directions parallel with the surface of the pipe.

Finally it should be noted that the outer armouring layer gives the liner resistance against increase of the volume surrounded by the liner. The liner will attempt to expand its volume, either as a result of the inner pressure in the pipe, or as a result of tensile forces in the longitudinal direction of the liner.

On the outside of the liner, but under the outer armouring layer, one or more layers can be provided which are without structural significance but which give the liner additional thermal resistance, so that the exchange of thermal energy between the fluid transported in the liner and the liner's surroundings is reduced.

With the object of protecting the outer armour against mechanical damages, a permeable sheath can lie on the outside of the outer armouring layer.

It must be added that the different layers (liner and inner/outer armouring layers) are not chemically bound to one another, which ensures the flexibility of the pipe. Since the individual elements of the pipe are not chemically bound to one another, this type of pipe is referred to in the literature as "unbonded".

Expedient embodiments of the inner armouring layer are disclosed in more detail in the claims 2–7, while expedient embodiments of the outer armouring layer are disclosed in more detail in the claims 8–12.

The invention will now be explained in more detail with reference to the drawing, in which:

FIG. 1 schematically shows the customary structure of a known pipe,

FIG. 2 schematically shows an embodiment of a pipe according to the invention,

Figure 1:
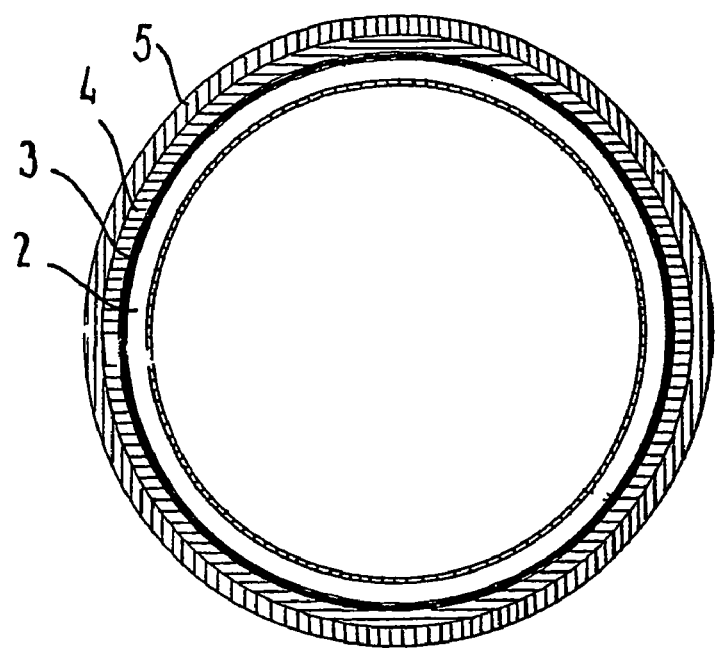

The reference number 2 in FIG. 1 indicates a liner, which is surrounded by two or more armouring layers 3,4, which in turn are surrounded by an impermeable outer sheath 5. A more detailed structure of such a pipe can be found, for example, in WO 00/36324, and therefore this will not be discussed in more detail here.

It should be noted, however, that the impermeable outer sheath 5 ensures that the armouring layers 3,4 are able to relieve the hydrostatic pressure placed on the pipe, in that the armouring layers 3 and 4 have a very great rigidity. The liner 2 is hereby relieved.

An additional advantage of placing the armouring layers between the liner 2 and the outer sheath 5 is that by this construction there is achieved a complete or partial protection of the armouring layers 3,4, which can be produced as wire, against corrosion, which means that non-rustproof types of steel can be used as armouring material.

Figure 2:
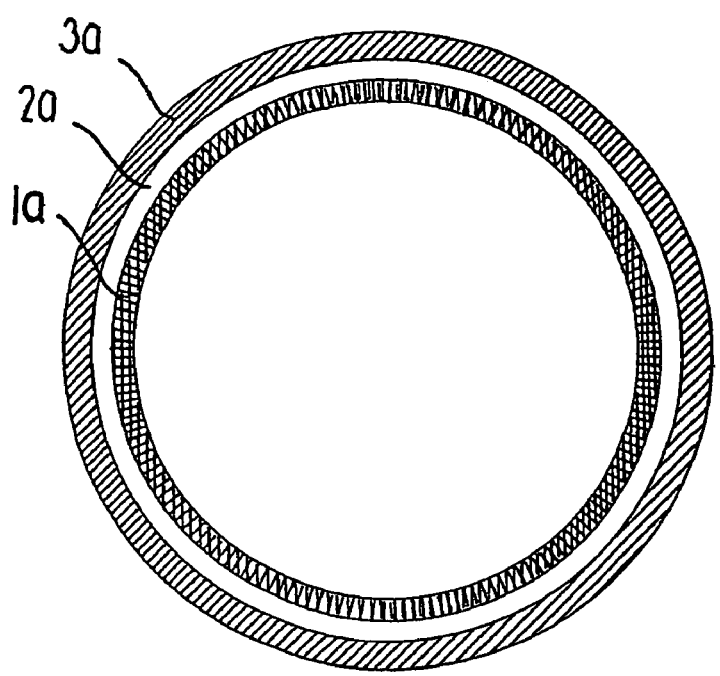

In FIG. 2 it is shown how a pipe according to the invention can be built up. A liner 2a surrounds an inner armouring layer 1a, the object of which is to prevent the collapse of the liner 2a. In a preferred embodiment, the inner armouring layer 1a is wound from long profiles with a numerical winding angle of more than 55° relative to the axis of the pipe. In a particularly preferred embodiment, these profiles will be made of rolled stainless steel.

On the outside of the liner 2a one or more armouring layers 3a are laid, where at least two of these are wound with a numerical angle greater than 45° relative to the axis of the pipe.

In a particularly preferred embodiment, the outer armouring layer 3 is produced from aramide cord on which a layer of thermoplastic polymer is applied.

In a second particularly preferred embodiment, the outer armouring layer 3a is completely or partly produced from a carbon-fibre-reinforced material.

Numerous other armouring materials can, however, be envisaged in the outer armouring layer, merely providing that these meet the demands regarding strength and resistance to the surrounding environment.

In some cases, consideration can be given to the application of a protection layer on the outside of the outer armouring layer 3a. This protection layer, which is permeable for fluids, has only a secondary function and will not be dealt with further.

The invention will now explained more fully in connection with the following examples:

EXAMPLE 1

Pipes for the Transport of Oil Between an Installation on the Seabed and a Floating Installation.

This example describes a "free hanging" configuration, where the depth of the pipe under the surface of the sea is a monotonic increasing function of the length. In this configuration, the hydrostatic pressure around the pipe therefore increases monotonically along the length of the pipe.

The liner is made of a PVdF, the object of which is to form an effective diffusion barrier between the fluid, which is transported in the pipe, and the surrounding environment. In order to prevent an unintentional cooling of the transported fluid, a layer of polypropylene is extruded on the outside of the liner, the purpose of which is to serve as a thermal barrier. Although polypropylene is given here as an example, other materials and material combinations can just as well be used. Especially material combinations that include syntactic foam as a component can be considered to be suitable in this application.

In order to arm the liner against volume reduction, the inside of the liner is armed with a 12 mm-thick armouring layer, which is wound up of K profiles produced from duplex steel. The advantage of making use of K profiles in particular is that these display an especially great resistance against crushing as a result of the influences of outer pressure.

The outer armouring is built up of thin tapes of a carbon/epoxy composite, in between which a thermoplastic is melted. The outer armouring is wound on with an angle of approx. +/−55° in relation to the longitudinal axis of the pipe.

In order to protect the outer armouring during laying-out and operation, a sleeve of aramide is woven out over the outer armouring. This aramide sleeve gives the pipe a great abrasive strength. At the same time, this sleeve is so open to mass transport that a free or almost free transport of fluids can take place through the sleeve. Since said aramide sleeve is exposed to sunlight, a further covering layer will be applied in the zone close to the surface of the sea in order to prevent decomposition as a result of UV radiation. Said sleeve is woven in such a manner that it is resilient in the event of the pipe being compressed. In this way, in the event of the pipe being exposed to compression in the axial direction, it is ensured that the pipe's tensile armour can migrate radially and herewith reduce the compressive forces in this layer to an acceptable level.

EXAMPLE 2

Pipes for Transport of Oil Between an Installation on the Seabed and a Floating Installation.

This example describes a "steep S" configuration, where the depth of the pipe below the surface of the sea is not a monotonic increasing function of the length. In this configuration, the hydrostatic pressure around the pipe is therefore not monotonically increasing along the length of the pipe. The design presented here will be suitable for use in waters 2000 meters deep.

The liner is made of a PVdF, the object of which is to form an effective diffusion barrier between the fluid transported in the pipe and the surrounding environment. In order to prevent an unintentional cooling of the transported fluid, a layer of polypropylene is extruded on the outside of the liner, the object of which is to serve as thermal barrier.

Figure 3:
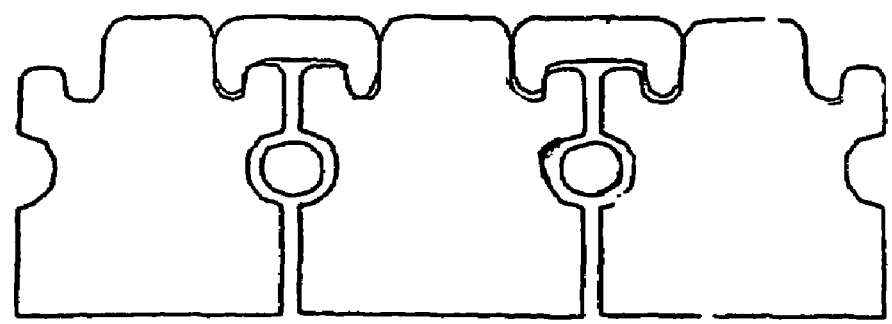
FIG. 3 shows a K-profile for the inner armor according to the invention.
Figure 4:
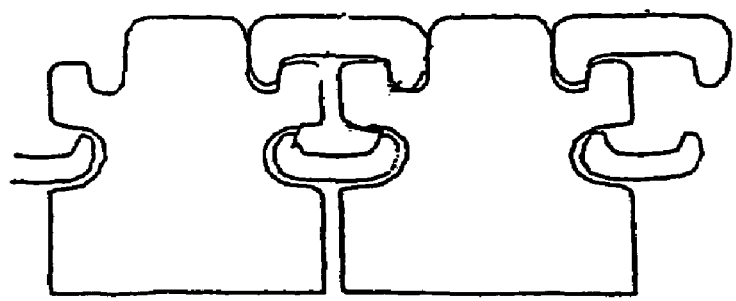
FIG. 4 shows a further embodiment corresponding to FIG. 3.

In order to arm the liner against volume reduction, the inside of the liner is armed with a 12 mm-thick armouring layer wound up of K profiles produced from duplex steel (as shown for example in FIGS. 3 and 4.)

The advantage of making use of K profiles in particular is that these display especially great resistance against crushing as a result of the influences of outer pressure.

The outer armouring is built up of two layers, the first of which consists of 2N layer of aramide cord, around which a layer of polymer is extruded. This first layer is wound with an angle of about 55° in relation to the axis of the pipe, and is the primary, force-bearing layer. Here, N denotes a whole number. Around this first layer a thinner, second layer is wound with a winding angle, which is considerably greater than 55° in relation to the axis of the pipe. The object of this second layer is to secure the primary, force-bearing layer in situations where this layer is non-supporting, since the net forces on the pipe result in a compressive clamping situation.

In order to further secure the position of the armouring wires, the armouring wires are lashed every 5–10 meters, simply to secure their position relative to the pipe.

To protect the armouring against damage during the laying-out and operation, a sheath of polyamide is extruded on the outside of the armour. In order to ensure that this sheath is permeable, holes with a diameter of approx. 1 centimeter are cut out at intervals of one meter, so that a free exchange of fluids between the inside of the pipe and the annulus of the pipe is ensured. The cutting-out of the holes will also ensure that the pipe's annulus is filled with seawater, which will ensure sufficient cooling of the aramide cords.

It is obvious that the present invention can be exercised in far more ways than disclosed above, in that within the scope of the patent claims there is great freedom for application of the principle of the invention, without this changing the invention's mode of operation.

What is claimed is:

1. A flexible armored pipe for transporting a fluid substance, the flexible armored pipe comprising an impermeable liner, an outer armoring layer, and an inner armoring layer consisting of one or more wound armoring elements, the inner armoring layer being placed on the inside of the liner and the outer armoring layer is placed on the outside of the liner and consisting of at least two layers of wound armoring elements which are completely or partly permeable for fluids, wherein the outer armoring layer and the outer side of the impermeable liner are in contact with the surroundings so that no significant restrictions to mass transport exist outside the impermeable layer.

2. The pipe according to claim 1, wherein the inner armoring is built up of wound profiles.

3. The pipe according to claim 1, wherein the inner armoring is built up of K profiles.

4. The pipe according to claim 1, wherein the inner armoring is built up of profiles, which consist of rolled strip.

5. The pipe according to the claim 1, wherein the inner armoring consists of a plastic deformable material.

6. The pipe according to the claim 1, wherein the inner armoring consists of a type of alloyed steel.

7. The pipe according to the claim 1, wherein the inner armoring consists of titanium or an alloy hereof.

8. The pipe according to the claim 1, wherein the outer armoring is wound with long elements.

9. The pipe according to claim 8, wherein the outer armoring is wholly or partly reinforced with a composite material containing carbon fiber.

10. The pipe according to claim 9, wherein the outer armoring is wholly or partly reinforced with a material containing titanium.

11. The pipe according to claim 9, wherein the outer armoring is wound in such a manner that it does not absorb substantial axial stresses applied to the pipe, but instead relaxes by a mechanical displacement of the armoring elements.

12. The pipe according to claim 8, wherein the outer armoring is wholly or partly reinforced with a material containing aramide fiber.

13. The pipe according to claim 1 further comprising at least one thermally insulating layer between the impermeable liner and the outer armoring layer.

14. The pipe according to claim 1, wherein the layers of the flexible armored pipe are unbounded.

15. The pipe according to claim 1, wherein the outer armoring layer is produced from aramide cord on which a layer of thermoplastic polymer is applied.

16. The pipe according to claim 15, wherein the armoring cord of the outer armoring layer are lashed every 5–10 meters.

17. The pipe according claim 1, wherein the flexible armored pipe further comprises a resilient sleeve or sheath around the outer armoring layer, the sleeve or sheath being open to a free or almost free transport of fluids between marine environment and the outer armoring layer.

18. The pipe according to claim 17, wherein the sheath is provided with holes with a diameter of approximately 1 centimeter at intervals of 1 meter.

* * * * *

UNITED STATES PATENT AND TRADEMARK OFFICE
CERTIFICATE OF CORRECTION

PATENT NO. : 7,000,645 B2  
APPLICATION NO. : 10/398714  
DATED : February 21, 2006  
INVENTOR(S) : Kristian Glejbøl and Niels-Jørgen Rishøj Nielsen It is certified that error appears in the above-identified patent and that said Letters Patent is hereby corrected as shown below:

Title page,  
Item [12], "GlejbØl" should read -- Glejbøl --.  
Item [75], Inventors, "GlejbØl," should read -- Glejbøl, --.  
Item [30], Foreign Application Priority Data, insert  
-- Denmark        PA 2000 01510            October 10, 2000 --.

Column 6,  
Line 8, "hereof." should read -- thereof. --.  
Line 36, "are" should read -- is --.  
Line 38, "according claim" should read -- according to claim --.

Signed and Sealed this

Eleventh Day of July, 2006

JON W. DUDAS  
*Director of the United States Patent and Trademark Office*